US007272394B2

(12) United States Patent
Krishnakumar et al.

(10) Patent No.: US 7,272,394 B2
(45) Date of Patent: Sep. 18, 2007

(54) LOCATION ESTIMATION OF WIRELESS TERMINALS IN A MULTI-STORY ENVIRONMENT

(75) Inventors: Anjur Sundaresan Krishnakumar, Rocky Hill, NJ (US); P Krishnan, North Plainfield, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 334 days.

(21) Appl. No.: 10/776,588

(22) Filed: Feb. 11, 2004

(65) Prior Publication Data

US 2005/0176406 A1 Aug. 11, 2005

(51) Int. Cl.
*H04Q 7/20* (2006.01)
(52) U.S. Cl. .................. 455/435.2; 455/435.1
(58) Field of Classification Search .......... 455/404.2, 455/456.1–456.4, 422.1, 435.1, 433, 435.2; 709/223
See application file for complete search history.

(56) References Cited

U.S. PATENT DOCUMENTS

| 6,119,009 | A | 9/2000 | Baranger et al. | |
|---|---|---|---|---|
| 6,393,294 | B1 | 5/2002 | Perez-Breva et al. | |
| 6,664,925 | B1 | 12/2003 | Moore et al. | |
| 2003/0129992 | A1 | 7/2003 | Koorapaty et al. | |
| 2003/0222820 | A1* | 12/2003 | Karr et al. | 342/457 |
| 2004/0097229 | A1* | 5/2004 | Muhonen et al. | 455/435.1 |
| 2004/0203904 | A1* | 10/2004 | Gwon et al. | 455/456.1 |
| 2004/0219915 | A1* | 11/2004 | Bamburak et al. | 455/435.2 |

FOREIGN PATENT DOCUMENTS

| EP | 1 359 714 A2 | 11/2003 |
|---|---|---|
| WO | WO-00/50918 A2 | 8/2000 |
| WO | WO-03/021851 A2 | 3/2003 |

OTHER PUBLICATIONS

Paramvir Bahl et al., "RADAR: An In-Building RF-based User Location and Tracking System," Proceedings of IEEE Infocom 2000, Tel Aviv, Israel, Mar. 2000.
Paramvir Bahl et al., "Enhancements to the RADAR User Location and Tracking System," Microsoft Research Technical Report, Redmond, WA, Feb. 2000.
Thomas W. Christ et al., "A Prison Guard Duress Alarm Location System," Proc. IEEE International Carnahan Conference on Security Technology, Oct. 1993.
Andrew M. Ladd et al., "Robotics-Based Location Sensing using Wireless Ethernet," The Eigthth ACM International Conference on Mobile Computing and Networking (MOBICOM), Atlanta, GA, Sep. 2002.

(Continued)

*Primary Examiner*—Naghmeh Mehrpour (57) ABSTRACT

A method and apparatus are disclosed for estimating the location of a wireless terminal across multiple building floors. The illustrative embodiment determines the floor where the wireless terminal is presently located by using a majority logic-based heuristic. A plurality of signal monitors measure signals from the wireless terminal and provide those signal strength measurements to a location estimation server. Alternatively, the wireless terminal measures signals that are transmitted by a plurality of transmitting signal devices and provides those signal strength measurements to a location estimation server. The location estimation server determines the floor of the wireless terminal in accordance with the illustrative embodiment of the present invention.

25 Claims, 7 Drawing Sheets

OTHER PUBLICATIONS

P. Prasithsangaree et al., "On Indoor Position Location with Wireless LANs," The 13th IEEE Int'l Symposium on Personal, Indoor, and Mobile Radio Commun., Lisbon, Portugal, Sep. 2002.

Siddartha Saha et al., "Location Determination of a Mobile Device Using IEEE 802.11b Access Point Signals," IEEE Wireless Comm. and Networking Conf. 2003, New Orleans, Louisana, Mar. 2003.

Asim Smailagic et al., "Location Sensing and Privacy in a Context Aware Computing Environment," Pervasive Computing, 2001.

Moustafa Youssef et al., "WLAN Location Determinaiton via Clustering and Probability Distributions," IEEE Int'l Conf. on Pervasive Computing and Comm. 2003. Fort Worth, TX, Mar. 2003.

* cited by examiner

LOCATION ESTIMATION OF WIRELESS TERMINALS IN A MULTI-STORY ENVIRONMENT

FIELD OF THE INVENTION

The present invention relates to telecommunications in general, and, more particularly, to estimating the location of a wireless terminal.

BACKGROUND OF THE INVENTION

Figure 1:
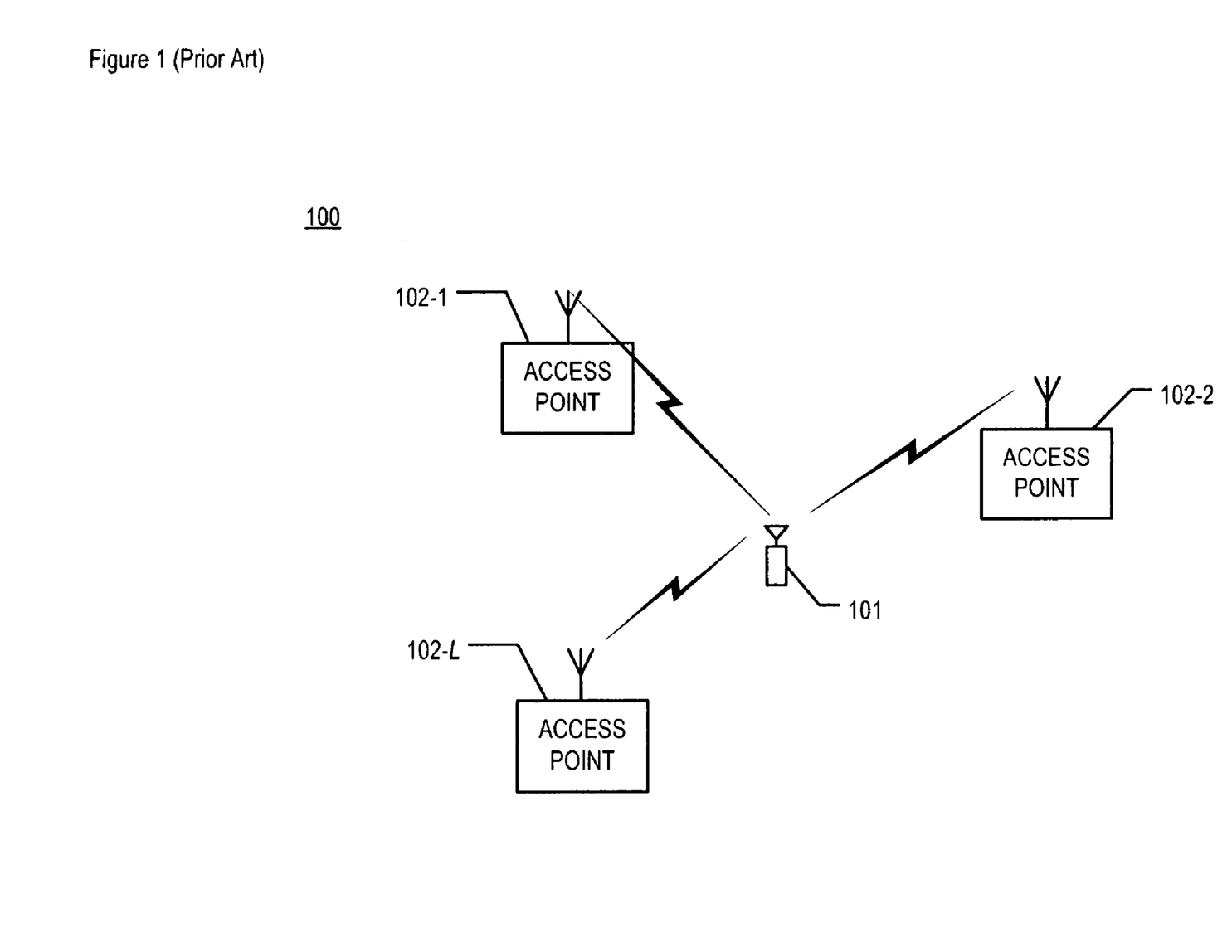
FIG. 1 depicts a schematic diagram of wireless network 100 in the prior art.

FIG. 1 depicts a schematic diagram of wireless network 100 in the prior art, which comprises wireless telecommunication terminal 101 and access points 102-1 through 102-L, interconnected as shown. Wireless terminal 101 uses access points 102-1 through 102-L to exchange blocks of data, or "packets," with computer servers that are external to wireless network 100. At any given time, wireless terminal 101 is associated with one of access points 102-1 through 102-L for the purpose of communicating with the external servers.

It is important in some operating scenarios to know the location of wireless terminal 101 within wireless network 100. Knowing the location enables, for instance, services that use end-user location information. Such services include location-aware content delivery, emergency location, services based on the notion of "closest resource," and location-based access control.

Figure 2:
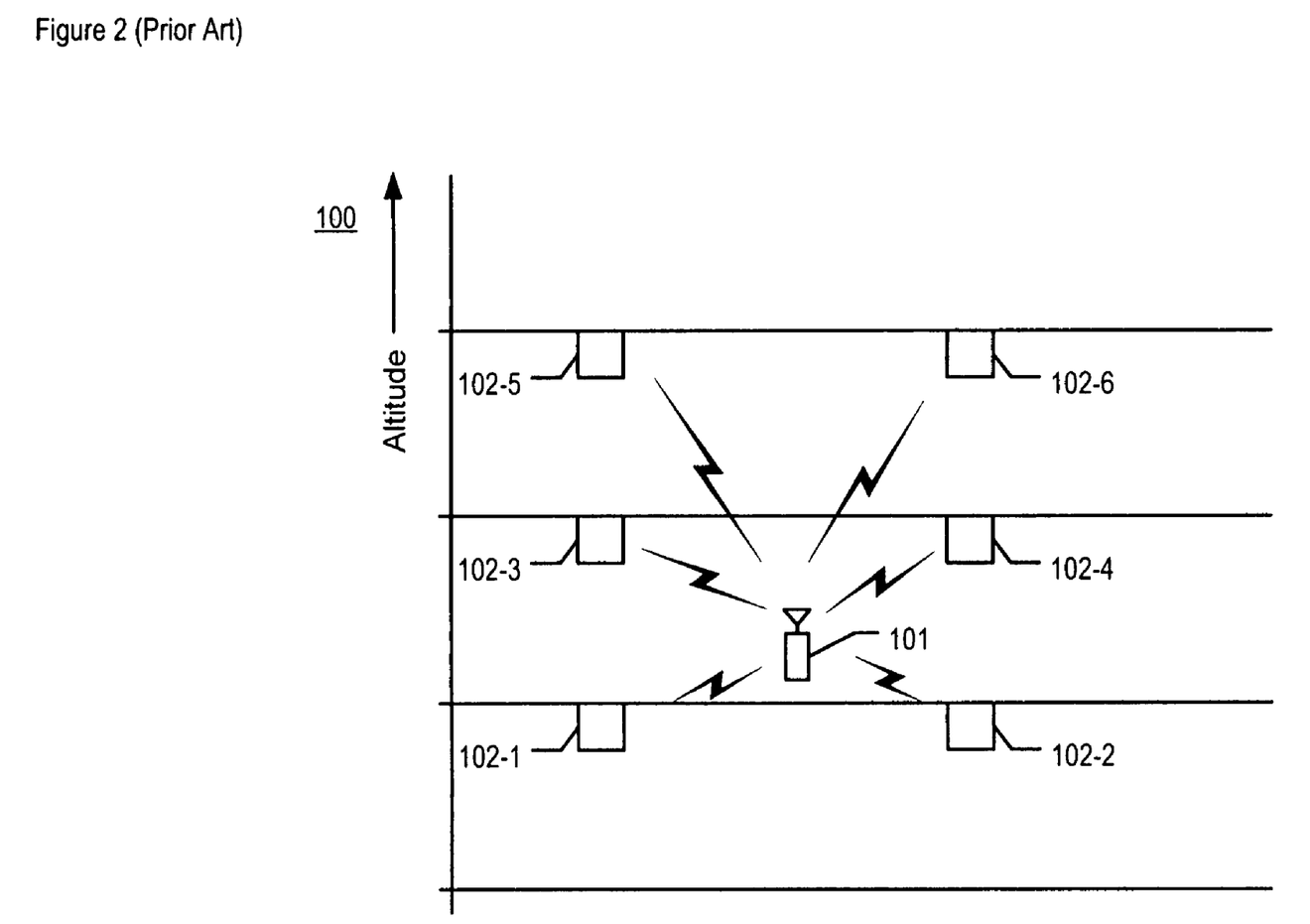
FIG. 2 depicts a schematic diagram of wireless network 100 in the prior art distributed across multiple floors of a building.

Various techniques for estimating location exist in the prior art. Although some prior art techniques perform well in some operating environments, there are other operating environments in which prior art techniques do not perform adequately. The example that follows highlights a shortcoming in prior art techniques. FIG. 2 depicts a schematic diagram of a cross-section of a building (e.g., an office complex, etc.). Access points 102-1 and 102-2 are situated on the first floor, access points 102-3 and 102-4 are situated on the second floor, and access points 102-5 and 102-6 are situated on the third floor.

In determining the location of wireless terminal 101 in FIG. 2, the problem is first determining the floor on which wireless terminal 101 is presently located. It has often been assumed in the prior art that determining the floor at which wireless terminal 101 is located should be straightforward, since a typical building floor in a multi-story environment significantly attenuates the signal from wireless terminal 101. Often, however, the signal from wireless terminal 101 can be received on more than one floor, as is the case in FIG. 2. The access points on multiple floors can receive a wireless terminal's signal in a variety of situations, such as where a building layout includes an atrium; where elevator shafts, stairwells, large ductwork, or escalators are present; etc. In these operating environments, it is sometimes the case that the floor receiving the strongest signal or the most signals is not the floor in which the wireless terminal is located.

What is needed is a technique to improve estimating the location of a wireless terminals across multiple building floors without some of the disadvantages of the prior art.

SUMMARY OF THE INVENTION

The present invention provides a technique to improve estimating the location of a wireless terminal across multiple building floors. The illustrative embodiment determines the floor where the wireless terminal is presently located by using a majority logic-based heuristic.

In some embodiments of the present invention, signal monitors receive, detect, and measure transmitted signals from the wireless terminal. The receivers are present on all floors. The illustrative embodiment of the present invention applies the signal strength measurements made by the receivers to a Majority Rule and a Stability Rule. In the Majority Rule, a majority of the receivers from which the m strongest signals can be detected are in the same floor F. In the Stability Rule, adding a value K to the m+1st signal strength measurement does not change the decision. The value for m is the minimum value for which both the Majority and Stability Rules hold. The wireless terminal is identified as being on floor F, in accordance with the illustrative embodiment of the present invention.

In some other embodiments of the present invention, transmitting signal devices that are present on all floors transmit signals that are received by a wireless terminal. The signal measurements made by the wireless terminal are applied by the illustrative embodiment to the Majority and Stability Rules previously described, with the exception that a majority of transmitting signal devices, rather than a majority of receivers, is considered in the heuristic.

An illustrative embodiment of the present invention comprises: acquiring signal strength measurements made at a plurality of receivers across a plurality of zones, wherein the signal strength measurements correspond to a signal transmitted from a wireless terminal; and determining the location of the wireless terminal to be within a candidate zone within the plurality of zones, wherein determining the location is based on: (i) the majority of receivers of a first m-receiver subset being located in the candidate zone, wherein the first m-receiver subset corresponds to the m strongest of the signal strength measurements; and (ii) the majority of receivers of a second m-receiver subset being located in the candidate zone, wherein the second m-receiver subset corresponds to the m strongest of the signal strength measurements after adding a value K to the m+1st strongest of the signal strength measurements; wherein m is a positive integer.

DETAILED DESCRIPTION

Figure 3:
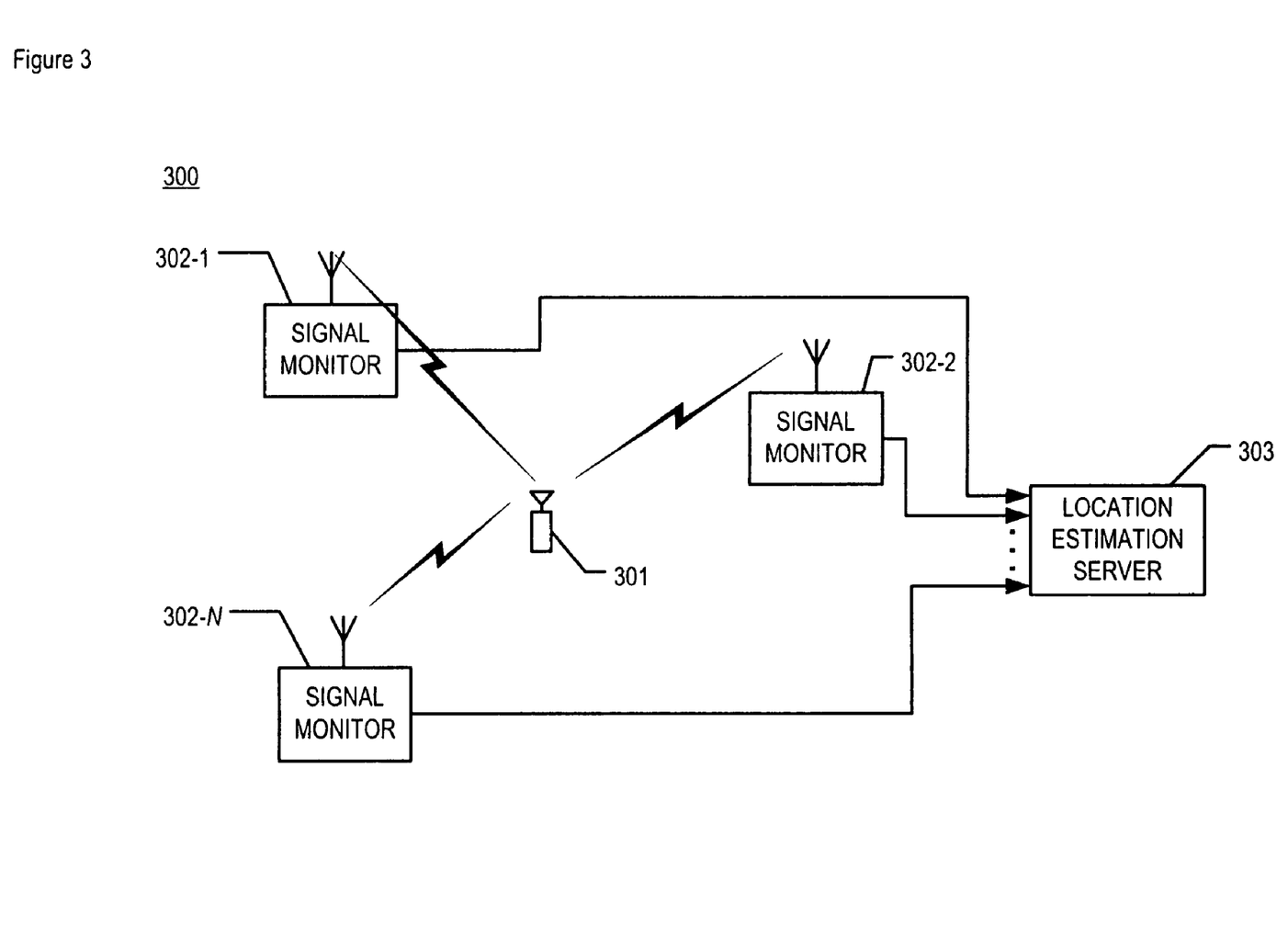
FIG. 3 depicts a schematic diagram of network 300 comprising the components of the illustrative embodiment of the present invention.

FIG. 3 depicts a schematic diagram of network 300 comprising the components of the illustrative embodiment of the present invention. Network 300 operates in accordance with a set of air interface protocols (e.g., IEEE 802.11, etc.) and comprises wireless terminal 301; signal monitors 302-1 through 302-N, wherein N is a positive integer; and location estimation server 303, interconnected as shown.

Wireless terminal 301 is capable of transmitting packets of data over a wireless medium in well-known fashion. The packets of data can comprise information that identifies wireless terminal 301. Wireless terminal 301 can be a communications station, a locating device, a handheld computer, a laptop with wireless capability, a telephone, etc. It will be clear to those skilled in the art how to make and use wireless terminal 301.

In some embodiments, wireless terminal 301 exchanges packets with an access point (not shown). In some other embodiments, wireless terminal 301 transmits packets specifically for the purpose of determining the location of wireless terminal 301. In some other embodiments still, wireless terminal 301 is capable of performing signal measurements and transmitting those measurements in well-known fashion.

Signal monitor 302-i, for i=1 through N, measures (i.e., "sniffs") signals transmitted by wireless terminal 301 over the wireless medium. Such signals include packets of data transmitted to the access point, packets transmitted specifically for measurement purposes, etc. Signal monitor 302-i determines the received signal strength (RSS) of those signals. Signal monitor 302-i sends the signal strength measurements to location estimation server 303. In some embodiments, signal monitor 302-i receives the identifying information transmitted by wireless terminal 301 and sends it to location estimation server 303. In some embodiments, signal monitor 302-i sends its location (e.g., actual coordinates, identifier, etc.) to location estimation server 303. The salient details of signal monitor 302-i, also referred to as a type of "signal device," are described below and with respect to FIG. 4.

FIG. 3 depicts a wired interface between signal monitors 302-1 through 302-N and location estimation server 303. Signal monitors 302-1 through 302-N, however, can communicate with location estimation server 303 via a wired interface, the wireless medium, or both in well-known fashion.

Location estimation server 303 acquires the received signal strength measurements from signal monitors 302-1 through 302-N. Location estimation server 303 processes the received signal strength measurements corresponding to wireless terminal 301 in accordance with the illustrative embodiment of the present invention. The salient details of location estimation server 303 are described below and with respect to FIG. 5.

Figure 4:
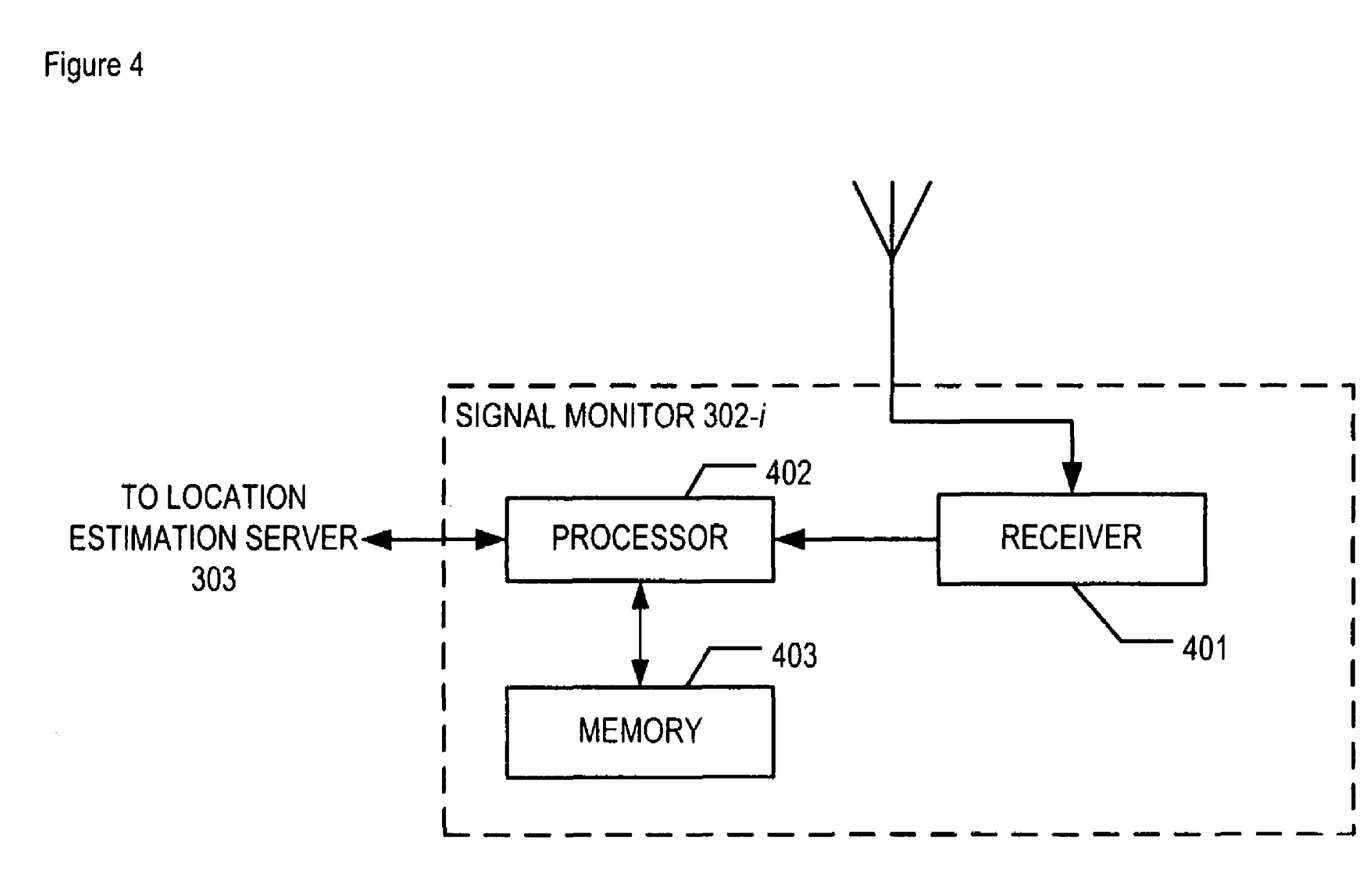
FIG. 4 depicts a block diagram of the salient components of signal monitor 302-i in accordance with the illustrative embodiment of the present invention.

FIG. 4 depicts a block diagram of the salient components of signal monitor 302-i in accordance with the illustrative embodiment of the present invention. Signal monitor 302-i comprises receiver 401, processor 402, and memory 403, interconnected as shown.

Receiver 401 is a circuit that is capable of receiving packets from the wireless medium, in well-known fashion, and of forwarding them to processor 402. It will be clear to those skilled in the art how to make and use receiver 401.

Processor 402 is a general-purpose processor that is capable of performing the tasks described below and with respect to FIGS. 6 and 7. It will be clear to those skilled in the art, after reading this specification, how to make and use processor 402.

Memory 403 is capable of storing programs and data used by processor 402. It will be clear to those skilled in the art how to make and use memory 403.

Figure 5:
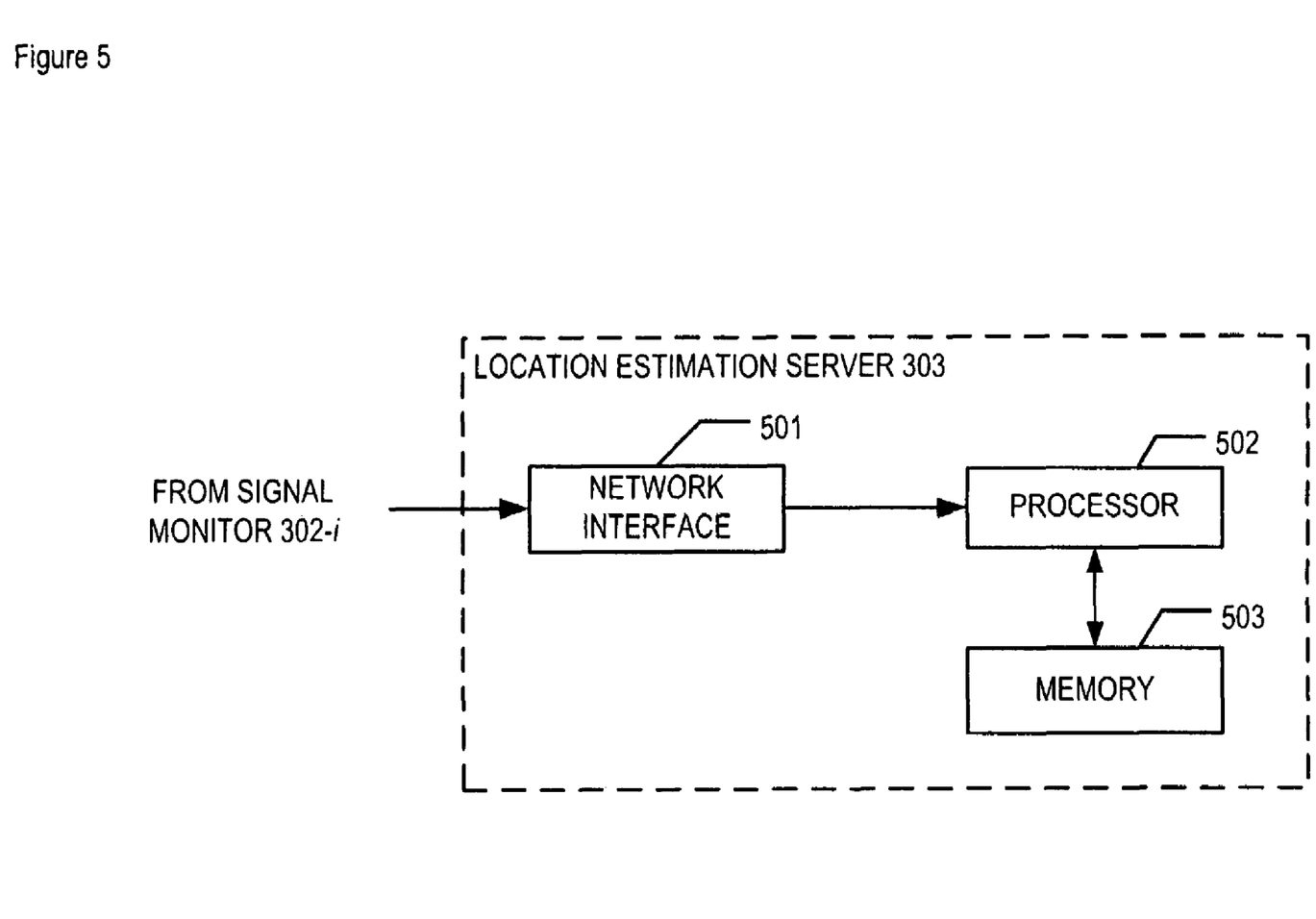
FIG. 5 depicts a block diagram of the salient components of location estimation server 303 in accordance with the illustrative embodiment of the present invention.

FIG. 5 depicts a block diagram of the salient components of location estimation server 303 in accordance with the illustrative embodiment of the present invention. Location estimation server 303 comprises network interface 501, processor 502, and memory 503, interconnected as shown.

Network interface 501 is a circuit that is capable of receiving, in well-known fashion, received signal strength measurements from signal monitors 302-1 through 302-N. In some embodiments, network interface 501 receives information from signal monitors 302-1 through 302-N with which the location of the signal monitor can be determined. Network interface 501 is also capable of forwarding the information received to processor 502. It will be clear to those skilled in the art, after reading this specification, how to make and use network interface 501.

In some other embodiments, network interface 501 receives signal strength measurements made by wireless terminal 301 (i.e., through an intermediate device such as an access point). In this case, the signal strength measurements are representative of signals that are transmitted by transmitting signal devices distributed across the network.

Processor 502 is a general-purpose processor that is capable of performing the tasks described below and with respect to FIGS. 6 and 7. It will be clear to those skilled in the art, after reading this specification, how to make and use processor 502.

Memory 503 is capable of storing programs and data used by processor 502. It will be clear to those skilled in the art how to make and use memory 503.

Figure 6:
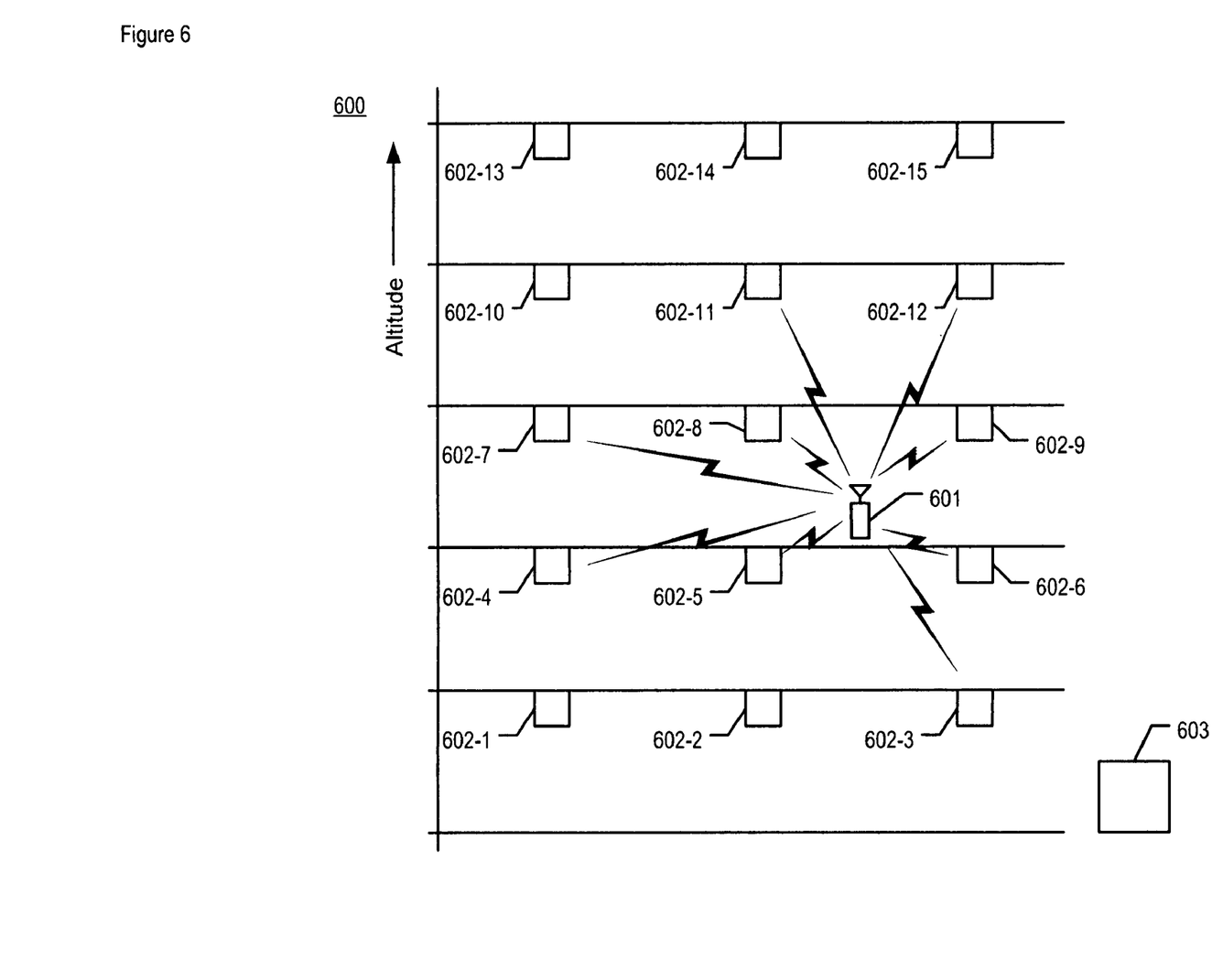
FIG. 6 depicts a schematic diagram of wireless network 600 distributed across multiple floors of a building, in accordance with the illustrative embodiment of the present invention.

FIG. 6 depicts an example of the illustrative embodiment of the present invention. In wireless network 600, signal devices 602-1 through 602-15 are distributed across a multi-story office building. In the example, signal devices 602-1 through 602-3 are on the lowest floor depicted, while signal devices 602-13 through 602-15 are on the highest floor depicted.

Signal devices 602-1 through 602-15 in the example are signal monitors that are capable of receiving signals and making signal measurements.

It will be clear to those skilled in the art, after reading this specification, how to make and use embodiments of the present invention with a different number of signal devices on a different number of floors and with multiple wireless terminals present.

Each floor is considered to be a "zone" within a larger space (i.e., the building). It will be clear, however, to those skilled in the art, after reading this specification, how to make and use embodiments of the present invention that applies the concept of zones to signify something other than the floors of a building.

Wireless terminal 601 transmits packets of data in well-known fashion. One or more of signal devices 602-1 through 602-15 detect the signal corresponding to the packets of data transmitted by wireless terminal 601. In the example depicted in FIG. 6, signal devices 602-3, 602-4, 602-5, 602-6, 602-7, 602-8, 602-9, 602-11, and 602-12 are receiving and measuring the signal transmitted by wireless terminal 601. Note that the signal paths of the signal that is transmitted by wireless terminal 601 traverse a plurality of zones (i.e., floors).

In some other embodiments of the present invention, signal devices 602-1 through 602-15 transmit signals. At least some of the signals are received by wireless terminal 601. Wireless terminal 601 makes signal measurements on the received signals and transmits the signal measurements, in well-known fashion, to location estimation server 603 (e.g., through an intermediary access point, etc.).

Location estimation server 603 acquires the signal strength measurements made by one or more of signal devices 602-1 through 602-15 in accordance with the illustrative embodiment of the present invention.

Figure 7:
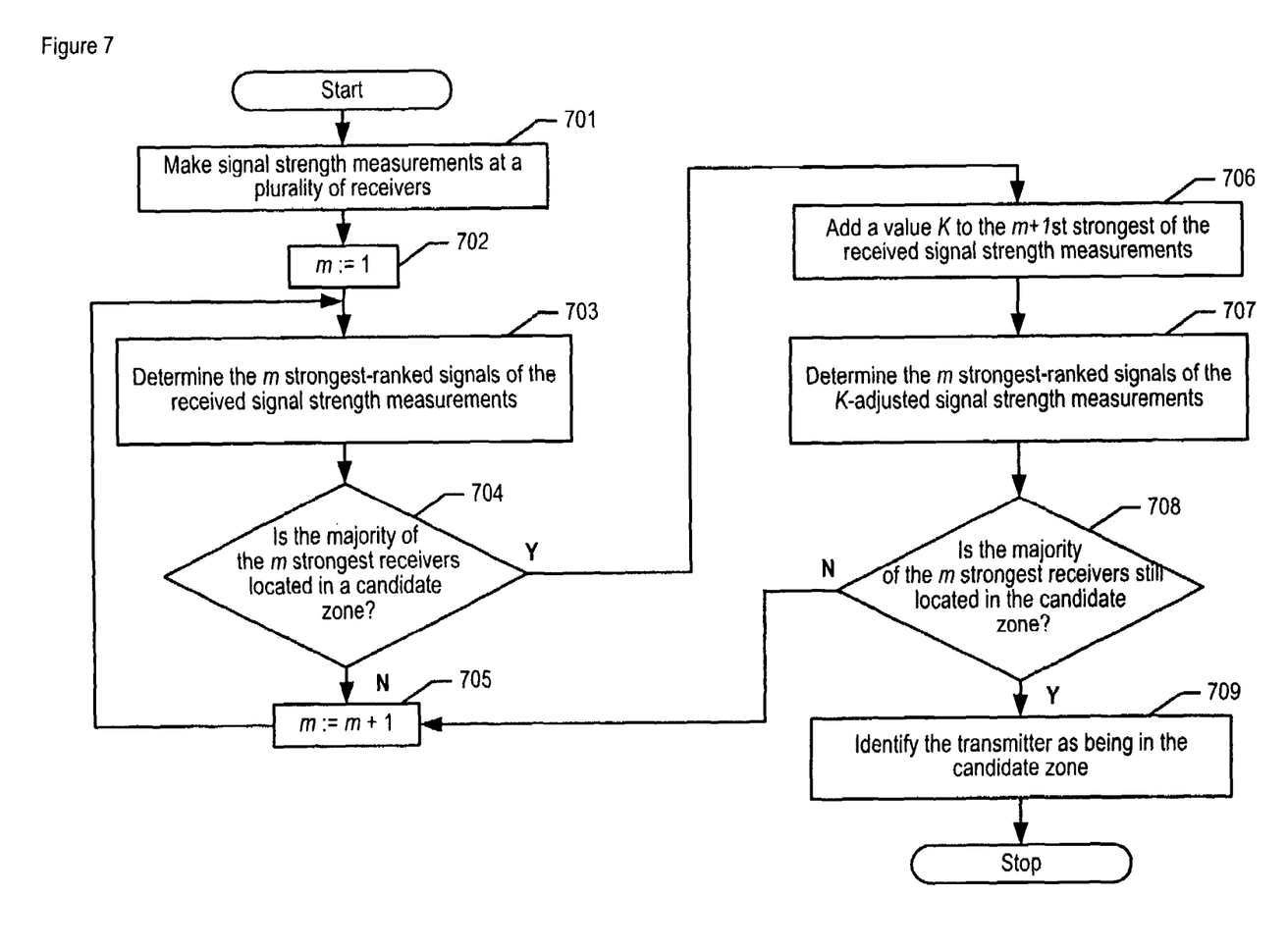
FIG. 7 depicts a flowchart of the salient tasks performed by the illustrative embodiment of the present invention.

FIG. 7 depicts a flowchart of the salient tasks performed by the illustrative embodiment, continuing with the example depicted in FIG. 6. It will be clear to those skilled in the art which tasks depicted in FIG. 7 can be performed simultaneously or in a different order than that depicted.

At task 701, each of signal devices 602-1 through 602-15 makes a signal strength measurement of a signal transmitted by wireless terminal 601. Location estimation server 603 acquires the signal strength measurements obtained by some or all of signal devices 602-1 through 602-15.

At task 702, the quantity m is initialized to 1. The quantity m is significant in that the illustrative embodiment finds the minimum value for m such that a Majority Rule holds and a Stability Rule holds. These rules are described below in detail.

At task 703, location estimation server 603 determines the m strongest-ranked signals of the received signal strength measurements (as opposed to signal strength measurements adjusted by a value K that is described below).

At task 704, location estimation server 603 determines whether or not the majority of the receivers that correspond to the m strongest-ranked signals of the received signal strength measurements are located on a particular floor (i.e., a candidate zone) within the building. This is referred to in the illustrative embodiment as the "Majority Rule." If so, control proceeds to task 706. If not, control proceeds to task 705.

At task 705, the quantity m is incremented by one. Control then proceeds to task 703.

At task 706, location estimation server 603 adds a value K to the m+1st strongest of the received signal strength measurements. In some embodiments, the value K is between 4 dB and 6 dB, inclusive. In other embodiments, the value K is dependent on the value of m. It will be clear to those skilled in the art, after reading this specification, how to assign a value for K.

At task 707, location estimation server 603 determines the m strongest-ranked signals of the signal strength measurements that now include the measurement that has been adjusted by the value K. Note that the action performed at task 706 might have affected the makeup of the m strongest-ranked signals.

At task 708, location estimation server 603 determines whether or not the majority of the receivers that correspond to the m strongest signals that have been re-ranked at task 707 are still located on the same floor as before (i.e., the candidate zone) within the building. This is referred to in the illustrative embodiment as the "Stability Rule." If so, control proceeds to task 709. If not, control proceeds to task 705.

At task 709, location estimation server 603 identifies wireless terminal 601 as being on the particular floor (i.e., the candidate zone) determined by applying the Majority Rule and Stability Rule.

The tasks depicted in FIG. 7 use a plurality of signal monitors and a location estimation server to determine the floor in which a wireless terminal is located. It will be clear, however, to those skilled in the art, after reading this specification, how to make and use embodiments of the present invention with other devices, such as access points to make measurements and a general-purpose server to apply the Majority Rule and Stability Rule to those measurements.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method of locating a portable device wherein a signal is transmitted from the portable device and received at various strengths at plural receivers in plural zones or wherein plural signals are transmitted from plural transmitters in plural zones and received at various strengths by the portable device, the method comprising:
    ranking the signals received at various strengths in the order of strength;
    considering the m strongest signals to be a first subset, where m is a positive integer;
    when a majority of the m strongest signals of the first subset are associated with a same zone, considering that same zone to be a candidate zone;
    adding a value k to the strongest signal not in the first subset, which may or may not change the ranking of the signals received at various strengths in the order of strength;
    considering the m strongest signals to be a second subset;
    when a majority of the m strongest signals of the second subset are associated with a same zone, determining whether that same zone matches the candidate zone, and if so, determining the portable device to be located in the candidate zone.

2. The method of claim 1, wherein said method first sets m equal to 1, and if the portable device cannot be determined as being located in the candidate zone, said method increments m to equal 2 and repeats analysis of the first and second subsets in an attempt to locate the portable device.

3. The method of claim 2, wherein if the portable device cannot be determined as being located in the candidate zone when m equals 2, said method increments m to equal 3 and repeats analysis of the first and second subsets in an attempt to locate the portable device.

4. The method of claim 1, wherein said method first sets in equal to the positive integer, and if the portable device cannot be determined as being located in the candidate zone, said method increments m to equal the positive integer plus one and repeats analysis of the first and second subsets in an attempt to locate the portable device.

5. The method of claim 4, wherein if the portable device cannot be determined as being located in the candidate zone after a first incrementing of m, said method continues a cycle of incrementing m and repeating analysis of the first and second subsets in an attempt to locate the portable device.

6. The method of claim 1, wherein the plural zones correspond to floors of a building.

7. The method of claim 1, wherein the value k equals a fixed amount between 4 and 6 dB, inclusive.

8. The method of claim 1, wherein the value k equals a variable amount that is dependent on the value of m.

9. The method of claim 1, wherein the signals received at various strengths are specifically for locating the portable device.

10. The method of claim 1, wherein the signals received at various strengths are packets of data by which the portable device communicates with an access point.

11. The method of claim 1, wherein the signals received at various strengths are received by the portable device.

12. The method of claim 1, wherein the signals received at various strengths are received by the plural receivers.

13. An apparatus for locating a portable device wherein a signal is transmitted from the portable device and received at various strengths at plural receivers in plural zones or wherein plural signals are transmitted from plural transmitters in plural zones and received at various strengths by the portable device, the apparatus comprising:
   a processor:
      ranking the signals received at various strengths in the order of strength;
      considering the m strongest signals to be a first subset, where m is a positive integer;
      when a majority of the m strongest signals of the first subset are associated with a same zone, considering that same zone to be a candidate zone;
      adding a value k to the strongest signal not in the first subset, which may or may not change the ranking of the signals received at various strengths in the order of strength;
      considering the m strongest signals to be a second subset;
      when a majority of the m strongest signals of the second subset are associated with a same zone, determining whether that same zone matches the candidate zone, and if so, determining the portable device to be located in the candidate zone.

14. The apparatus of claim 13, wherein said processor first sets m equal to 1, and if the portable device cannot be determined as being located in the candidate zone, said processor increments m to equal 2 and repeats analysis of the first and second subsets in an attempt to locate the portable device.

15. The apparatus of claim 14, wherein if the portable device cannot be determined as being located in the candidate zone when m equals 2, said processor increments m to equal 3 and repeats analysis of the first and second subsets in an attempt to locate the portable device.

16. The apparatus of claim 13 wherein said processor first sets in m equal to the positive integer, and if the portable device cannot be determined as being located in the candidate zone, said processor increments m to equal the positive integer plus one and repeats analysis of the first and second subsets in an attempt to locate the portable device.

17. The apparatus of claim 16, wherein if the portable device cannot be determined as being located in the candidate zone after a first incrementing of m, said processor continues a cycle of incrementing m and repeating analysis of the first and second subsets in an attempt to locate the portable device.

18. The apparatus of claim 13, wherein the plural zones correspond to floors of a building.

19. The apparatus of claim 13, wherein the value k equals a fixed amount between 4 and 6 dB, inclusive.

20. The apparatus of claim 13, wherein the value k equals a variable amount that is dependent on the value of m.

21. The apparatus of claim 13, wherein the signals received at various strengths are specifically for locating the portable device.

22. The apparatus of claim 13, wherein the signals received at various strengths are packets of data by which the portable device communicates with an access point.

23. The apparatus of claim 13, wherein the signals received at various strengths are received by the portable device and transmitted to said processor.

24. The apparatus of claim 13, wherein the signals received at various strengths are received by the plural receivers and transmitted to said processor.

25. The apparatus of claim 24, wherein the plural receivers also transmit receiver location information to said processor.

* * * * *